J. DOAK.
Corn-Planter.
No. 45,395.
Patented Dec 13, 1864.
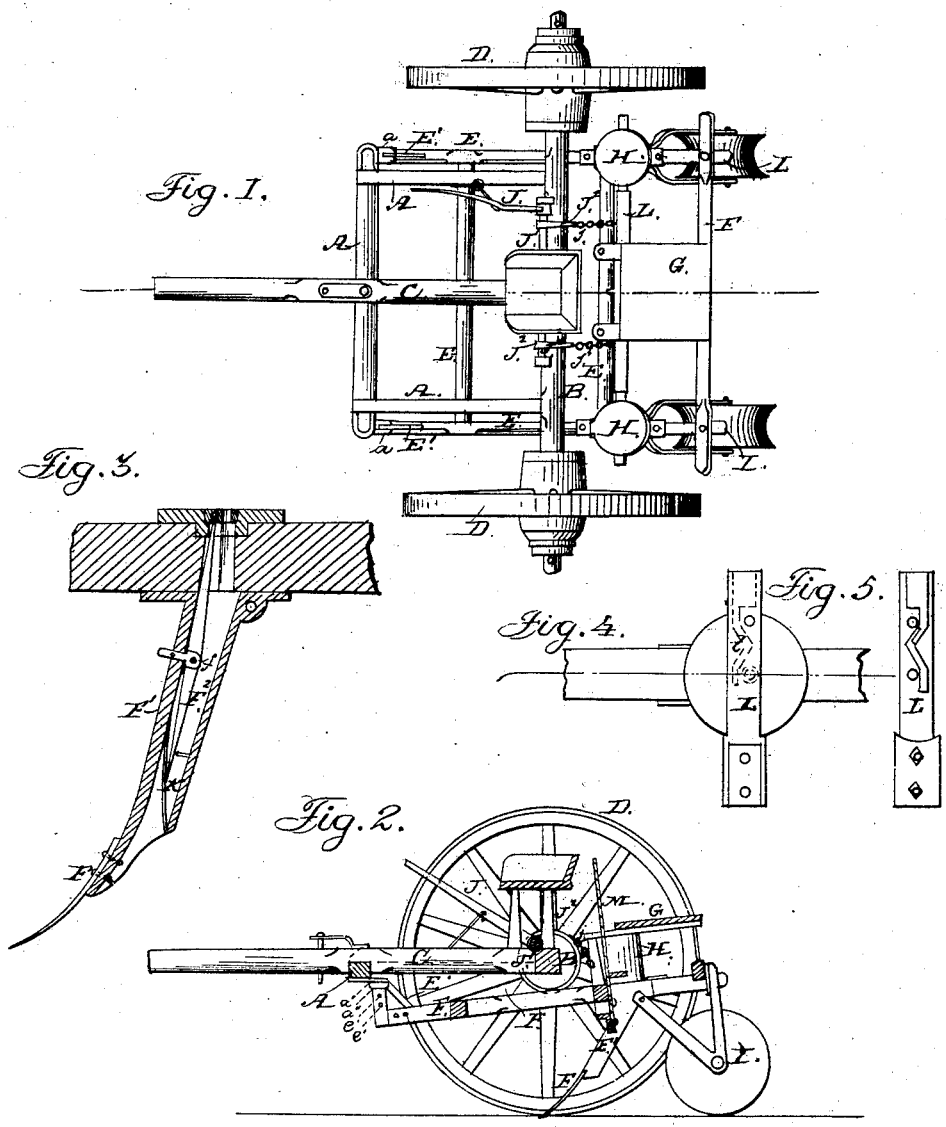
WITNESSES:
INVENTOR
John Doak

UNITED STATES PATENT OFFICE.

JOHN DOAK, OF KEITHSBURG, ILLINOIS.

IMPROVEMENT IN CORN-PLANTERS.

Specification forming part of Letters Patent No. 45,395, dated December 13, 1864.

*To all whom it may concern:*

Be it known that I, JOHN DOAK, of Keithsburg, in the county of Mercer and State of Illinois, have invented a new and useful Improvement in Corn-Planters; and I do hereby declare the following to be a full and exact description of the same, reference being had to the accompanying drawings, making part of this specification, in which—

Figure 1 is a plan of my improved corn-planter. Fig. 2 is a vertical section thereof in the line $x\,x$, Fig. 1. Figs. 3, 4, and 5 are detached views of the seed-dropping mechanism.

Similar letters of reference indicate corresponding parts in the several figures.

This invention consists, first, in the employment, in connection with a common frame mounted upon the ordinary carrying-wheels, of a detachable pivoted frame provided with shovels for making the furrows, concave wheels for covering the grain, and grain boxes or hoppers, and adapted to be raised, when the operation is to be suspended, by means of single lever; second, in the peculiar method of operating the seed-dropping mechanism.

To enable others skilled in the art to which my invention appertains to fully understand and use the same, I will proceed to describe its construction and operation.

In the accompanying drawings, A represents a frame, B an axle, and C a tongue, conjoined to each other in any suitable manner. The axle B is journaled in carrying-wheels D D.

E is a frame, on the forward end of which are angular plates E', which admit of the attachment of the frame E to lugs $a$ on the frame A by pivots $a'$. By adjusting the pivots $a'$ in apertures $e$ in the plates E' the depth to which the shovels F penetrate may be varied to any desired extent. The shovels F are secured to the lower ends of the conducting-tubes F', at the front sides thereof, in order that the operator, who sits upon the seat G, may have an unobstructed view of the points where the seed falls, and thus ascertain whether the seed is being deposited regularly. The conducting-tubes F' are attached to the frame E at a point behind the axle B, and above them, upon said frame E, are mounted the seed boxes or hoppers H.

I I are wheels having concave rims, and attached to the rear end of the frame E, and arranged so as to run in the tracks of the shovels F, for the purpose of covering the grain.

J is a lever fitted upon and adapted to rotate a horizontal shaft, J', the ends of which are journaled in lugs inserted in the axle B. On the shaft J' are arms $J^2$, which, through the medium of links or cords $j$, raise the frame E and shovels F, when the said shaft is partially rotated by the depression of the lever J. The lever J may be adapted to be operated by the hand or foot, and is retained in a depressed condition by a link, $j'$, which takes over a link, $j^2$.

By mounting a planter upon ordinary carrying-wheels and employing the shovels F in lieu of the runners or markers hitherto and at present in common use, the machine may be drawn with reduced power, and will perform its work in a more effectual manner.

In each of the conducting-tubes F' is an arm or bar, $F^2$, which is pivoted at $f$, and employed to open a spring-valve, K, at proper intervals for depositing the seed. The top of each arm $F^2$ fits in an angular groove, $l$, on the under side of the seed-slide L, which groove, when the slide is in motion, actuates the arm $F^2$ in such a way that its lower end, with every movement of the slide L, is first moved against and then made to recede from the valves K, so as to open the latter to permit the grain to fall into the ground and then allow it to close. The slide L is reciprocated by means of a lever, M, having its fulcrum upon one of the beams of the frame E.

The frame E may be readily detached from the frame A, and a cultivator-frame substituted therefor, and the conversion of the implement is attended with scarcely any labor, all the devices which form the furrows, contain and drop the seed, and cover the same being attached to and consequently detached with the frame E. When the frame E has been detached and a cultivator-frame used in its stead, the lever J may be used to elevate such cultivator-frame for suspending the operation or avoiding obstacles.

Having thus described my invention, the following is what I claim as new therein and desire to secure by Letters Patent:

1. The adjustably-pivoted frame E, when provided with the shovels F, conducting-tubes F', grain boxes or hoppers H, and covering-wheels I, and adapted to be operated by the lever J, in the manner and for the purpose set forth.

2. Operating the dropping-wheels K by means of pivoted arms or bars F², actuated, respectively, by an angular groove, $l$, in the seed-slide L, substantially as set forth.

JOHN DOAK.

Witnesses:
CHARLES D. SMITH,
JAMES H. GRIDLEY.